United States Patent [19]

Karakama et al.

[11] Patent Number: 5,076,144

[45] Date of Patent: Dec. 31, 1991

[54] POPPET VALVE DEVICE

[75] Inventors: Tadao Karakama; Sadao Nunotani; Naoki Ishizaki; Toshiro Takano, all of Kawasaki, Japan

[73] Assignee: Kabushiki Kaisha Komatsu Seisakusho, Tokyo, Japan

[21] Appl. No.: 474,029

[22] PCT Filed: Aug. 24, 1989

[86] PCT No.: PCT/JP89/00867

§ 371 Date: Jun. 20, 1990

§ 102(e) Date: Jun. 20, 1990

[87] PCT Pub. No.: WO90/02283

PCT Pub. Date: Mar. 8, 1990

[30] Foreign Application Priority Data

Aug. 24, 1988 [JP] Japan ................................ 63-208450
Aug. 31, 1988 [JP] Japan ................................ 63-215279

[51] Int. Cl.⁵ ........................ F15B 13/04; F16K 13/06

[52] U.S. Cl. ........................................ 91/436; 91/450; 91/536; 137/596.15; 137/885

[58] Field of Search .......................... 91/436, 450, 536; 137/596.15, 885

[56] References Cited

FOREIGN PATENT DOCUMENTS 63-43083 2/1988 Japan .

*Primary Examiner*—Gerald A. Michalsky
*Attorney, Agent, or Firm*—Armstrong, Nikaido, Marmelstein, Kubovcik & Murray

[57] ABSTRACT

A poppet valve device according to the present invention is adapted to sequentially operate a plurality of poppet valves the switching operation of a pilot valve, for example, an electromagnetic solenoid or the like which operates in response to an external input signal. The above-mentioned poppet valve device includes first and second poppet valves (A, B) each of which is constructed so that a poppet (32) for communicating or intercepting an inlet port (30) and an outlet port (31) with or from each other may be moved towards a communicating position by an inlet port side pressure acting upon its pressure receiving portion (32*a*). The poppet (32) may be moved towards an intercepting position by a pressure acting upon its back pressure chamber (38*a*, 38*b*). A pilot valve (c) connects the respective back pressure chambers of these poppet valves to a tank (2) and includes a variable choke portion controlled by an external input signal so that the pressures at the respective back pressure chambers, when the respective poppets of the respective poppet valves are moved to the positions for communicating the respective inlet ports with the respective outlet ports, may be different from each other.

10 Claims, 6 Drawing Sheets

POPPET VALVE DEVICE

FIELD OF THE INVENTION

The present invention relates to a poppet valve device in which a plurality of poppet valves are operated to switch by switching operations of a pilot valve, and especially to a poppet valve device in which a plurality of poppet valves are sequentially operated to switch by switching operations of a pilot valve actuated by, for instance, an electromagnetic solenoid or the like which operates in response to an external input signal.

BACKGROUND OF THE INVENTION

A poppet valve device, in which a pressure difference is produced between the front and the rear of a poppet in a poppet valve by switching operations of a pilot valve, and thus the poppet is moved to operate the poppet valve for switching, has been known.

With such a poppet valve device, although a plurality of poppet valves can be simultaneously operated to switch by means of a single pilot valve, it is impossible to sequentially operate a plurality of poppet valves for switching.

Consequently, in the case where a plurality of poppet valves are to be sequentially operated for switching, pilot valves are respectively provided in correspondence to the respective poppet valves and provision is made such that the timings for operating the respective pilot valves for switching are shifted to sequentially operate for switching, hence not only a number of pilot valves is increased and a cost becomes high, but also the plurality of pilot valves must be sequentially operated for switching, and the operations would become very troublesome.

SUMMARY OF THE INVENTION

The present invention has been worked out in view of the above-mentioned circumstance, and one object of the invention is to provide a poppet valve device in which provision is made such that a plurality of poppet valves can be sequentially operated for switching by switching operations of a single pilot valve.

Another object of the present invention is to provide a poppet valve device, in which two, first and second, poppet valves are provided, and among these, a pressure on the outlet side of the first poppet valve can be made to be a preset pressure.

In order to achieve the above-mentioned objects, according to a first aspect of the present invention, there is provided a poppet valve device comprising at least two, first and second, or more, that is, a plurality of poppet valves, each of which is constructed in such manner that a poppet for communicating or intercepting an inlet port and an outlet port formed on one side of a cylindrical body fitted within a valve bore may be moved towards a communicating position by a pressure on the inlet port side acting upon its pressure receiving portion, while it may be moved towards an intercepting position by a pressure acting upon its back pressure chamber, and a pilot valve which connects the back pressure chambers of the respective ones of the aforementioned plurality of poppet valves to a tank, and which includes a variable choke portion controlled by an external input signal so that the pressures in the respective back pressure chambers when the respective poppets in the aforementioned respective poppet valves are moved to the positions for communicating the respective inlet ports with the respective outlet ports may be made different from one another.

According to a second aspect of the present invention, there is provided a poppet valve device as described above in connection to the first aspect, wherein the poppet of the aforementioned first poppet valve is mounted so as to be freely slidable along a smaller diameter cylindrical body of an axial body fitted within the above-mentioned cylindrical body from the other side of the cylindrical body, and is biased towards the above-mentioned intercepting position by a resilient force of a compression spring interposed between the above-mentioned axial body and the poppet, and the inner diameters of the respective ones of the aforementioned outlet port and the above-described poppet are made identical.

According to a third aspect of the present invention, there is provided a poppet valve device as described above in connection to the first aspect, wherein a valve opening pressure in the back pressure chamber when the poppet in the aforementioned first poppet valve is moved towards the above-described communicating position, is set lower than a valve-opening pressure of the above-mentioned second poppet valve.

According to a fourth aspect of the present invention, there is provided a poppet valve device as described above in connection to the first aspect, wherein the poppet in the aforementioned first poppet valve includes a back pressure chamber to which the pressure at its outlet port is introduced via a narrow hole drilled at the head portion of the poppet so that the above-mentioned poppet may be biased towards the intercepting position by the pressure at the outlet port, and a larger diameter portion formed integrally at the tip end portion of the aforementioned poppet valve so as to offset a pressing force in the direction directed to the communicating position of the above-described poppet caused by the pressure at the outlet port acting upon a seat surface of the poppet in the aforementioned first poppet valve.

According to a fifth aspect of the present invention, there is provided a poppet valve device as described above in connection to the first aspect, which comprises two, first and second poppet valves whose back pressure chambers are communicated with their tank sides so that the pressure acting upon the respective back pressure chambers may serve as a tank side pressure and also communicated with the inlet port sides via chokes, and a pilot valve including variable choke portions provided between the above-mentioned first and second poppet valves and a tank and controlled by an external input signal, wherein the construction is such that if the outlet side pressure of the above-mentioned first poppet valve becomes a preset pressure or higher, the inlet port and the outlet port of the aforementioned first poppet valve are intercepted from each other, whereas when the pressure in the back pressure chamber in the aforementioned second poppet valve causes the poppet in the aforementioned first poppet valve to come at the communicating position, if it becomes a lower pressure than the pressure in the back pressure chamber in the first poppet valve, the inlet port and the outlet port of the above-mentioned second poppet valve may be communicated with each other.

According to a sixth aspect of the present invention, there is provided a poppet valve device as described above in connection to the third aspect, wherein the inlet port of the aforementioned first poppet valve communicated with a boom raising pressure chamber in a boom cylinder of a construction machine such as a power shovel, and the outlet port communicates with a boom lowering pressure chamber in the above-mentioned boom cylinder.

According to a seventh aspect of the present invention, there is provided a poppet valve device as described above in connection to the fourth aspect, wherein the inlet port of the aforementioned first poppet valve communicates with a boom raising pressure chamber in a boom cylinder of a construction machine such as a power shovel, and the outlet port communicates with a boom lowering pressure chamber in the aforementioned boom cylinder.

According to an eighth aspect of the present invention, ther is provided a poppet valve device as described above in connection to the first aspect, wherein the aforementioned first poppet valve includes a rod body fitted in an inner bore of the poppet from the base end side of the same poppet via a compression spring, an axial rod inserted from the other side of the aforementioned cylindrical body fitted in the valve bore so as to support the above-mentioned rod body, and a push rod slidably fitted via a compression spring in an axial bore drilled in the aforementioned axial rod so as to bias the above-mentioned axial rod towards the head portion of the poppet.

According to a ninth aspect of the present invention, there is provided a poppet valve device as described above in connection to the eighth aspect, which comprises a pressure chamber formed between the above-mentioned push rod and the above-mentioned cylindrical body so as to push the aforementioned push rod towards the other side of the above-mentioned cylindrical body against the compression spring, and external pressure feed means communicated with the above-mentioned pressure chamber via communication holes formed respectively in the above-described cylindrical body and the above-described rod.

According to a tenth aspect of the present invention, there is provided a poppet valve device as described above in connection to the eighth aspect, which comprises a pressure chamber formed between the above-mentioned push rod and the above-mentioned cylindrical body so as to push the aforementioned push rod towards the above-mentioned cylindrical body against the compression spring, and a passageway for communicating the above-mentioned pressure chamber via communication holes formed respectively in the aforementioned cylindrical body and the aforementioned axial rod to the port formed in the above-described first poppet valve so as to communicate with the above-described pilot valve.

The above-mentioned and other objects, aspects and advantages of the present invention will become apparent for those skilled in the art from the following description and explanation with reference to the accompanying drawings which disclose preferred embodiments conformable to a principle of the present invention as practical examples.

DETAILED DESCRIPTION OF THE PREFERRED EMBODIMENTS

In the following, a number of preferred embodiments of the present invention will be explained with reference to the accompanying drawings.

Figure 1:
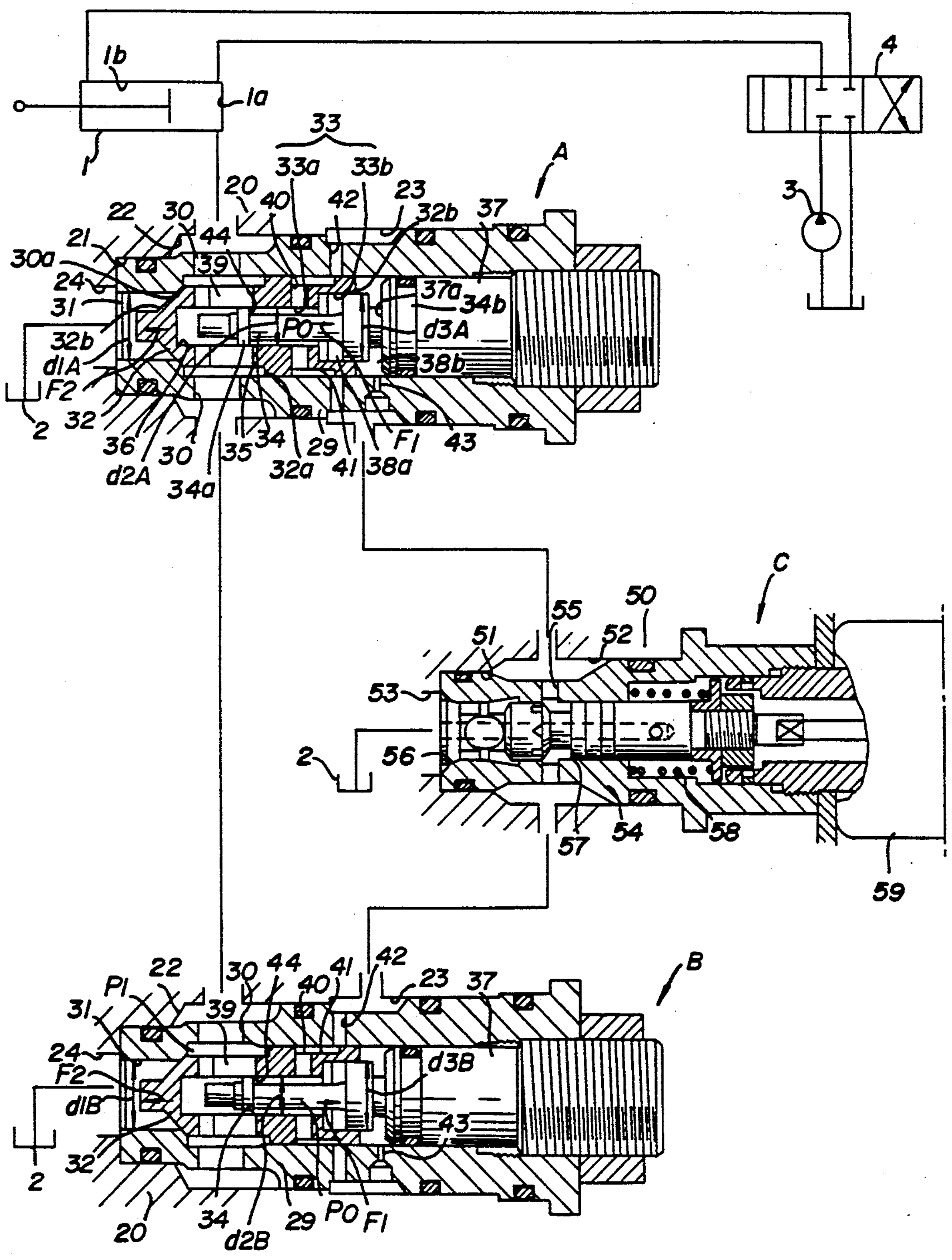
FIGS. 1 through 4 are schematic cross section views of an essential part, illustrating first to fourth preferred embodiments of the present invention.

As shown in FIG. 1, a first poppet valve A, a second poppet valve B and a pilot valve C are provided, and provision is made such that the first poppet valve A and the second poppet valve B are sequentially operated to switch by operating the pilot valve C to operate.

The above-mentioned first and second poppet valves A and B are respectively adapted to communicate or intercept a hydraulic actuator such as, for example, a raising pressure chamber 1*a* in a boom cylinder 1 of a power shovel with or from a tank 2, and the raising pressure chamber 1*a* and a lowering pressure chamber 1*b* of the boom cylinder 1 are adapted to be controllably fed with delivery pressurized oil of a pump 3 via an operation valve 4.

The above-mentioned first poppet valve A is constructed in the following manner.

That is, in a valve bore 21 of a valve main body 20 are respectively formed a first port 22 communicating with the raising pressure chamber 1*a* of the boom cylinder 1, a second port 23 communicating with the pilot valve C and a third port 24 communicating with the tank 2, also in the above-mentioned valve bore 21 is fitted and inserted a cylindrical body 29, in the aforementioned cylindrical body 29 are formed an inlet port 30 opening at the first port 22 and an outlet port 31 opening at the third port 24, also in the cylindrical body 29 is slidably fitted and inserted a poppet 32 for communicating or intercepting its input port 30 with or from its outlet port 31, in the above-mentioned poppet 32 is formed an axial bore 33 having a stepped configuration consisting of a smaller diameter bore 33*a* and a larger diameter bore 33*b*, and in the above-described axial bore 33 is fitted and inserted a spool 34 including a first land portion 34*a* having a smaller diameter and a second land portion 34*b* having a larger diameter, so that between the spool 34 and the smaller diameter bore 33*a* is formed an annular chamber 35, and between the larger diameter bore 33*b* and the second land portion 34*b* is formed a first back pressure chamber 38*a*.

The above-described spool 34 butts against a front surface 37*a* of an axial body 37 fixedly fitted and inserted in the aforementioned cylindrical body 29 due to a spring 36, and a second back pressure chamber 38*b* is formed between the front surface 37*a* and the rear surface 32*b* of the poppet 32, the above-mentioned annular chamber 35 is controllably opened to the above-described inlet port 30 through a variable choke 44 consisting of an inflow port 39 of slit groove shape formed in the poppet 32 and the first land portion 34*a* of the spool 34, also it communicates with the above-mentioned second port 23 through an oil hole 40 formed in the poppet 32 and an oil hole 42 formed in the smaller diameter portion 41 and the cylindrical body 29, and the above-described second back pressure chamber 38*b* communicates with the aforementioned second port 23 via a choke 43.

It is to be noted that the second poppet valve B is also similarly constructed. The above-described pilot valve C is constructed in the following manner. That is, in a valve bore 51 of a valve main body 50 are formed a first port 52 and a second port 53, also in the valve-bore 51 is fitted and inserted a cylindrical body 54, in this cylindrical body 54 is fitted and inserted a spool valve 37 for communicating or intercepting an inlet port 55 with or from an outlet port 56, the spool valve 57 is held at an intercepting position by a spring 58 and it is adapted to be moved to a communicating position by means of a solenoid 59, the first port 52 communicates with the second ports 23 of the aforementioned first and second poppet valves A and B, the second port 53 communicates with the tank 2, so that depending upon an amount of a current fed to the solenoid 59, an aperture area between the inlet port 55 and the outlet port 56 is increase or decreased to controllably increase or decrease a flow rate of the flow from the inlet port 52 to the tank 2 and thereby the pressure on the side of the inlet port 52 can be regulated. In other words, a variable choke portion which is controlled depending upon an amount of a current fed to the solenoid 59, is provided.

Because of the above-described construction, pressurized oil in the raising chamber 1*a* in the boom cylinder 1 flows sequentially through the first port 22, the inlet port 30, the variable choke 44, the annular chamber 35, the oil hole 40, the smaller diameter portion 41 and the oil hole 42 to the second port 23 and flows out to the tank 2 through the inlet port 55 and the outlet port 56 of the pilot valve C, when a current is fed to the solenoid 59 of the pilot valve C and the inlet port 55 and the outlet port 56 communicate with each other, hence a pressure difference is produced between the front and the rear of the variable choke 44, an inlet side pressure $P_1$ thereof acts upon a shoulder portion 32*a* of the poppet 32, and an outlet ride pressure $P_0$ acts upon the second back pressure chamber 38*b* through the first back pressure chamber 38*a* and the choke 43.

Here, since the above-mentioned pressure difference is determined depending upon the flow rate of the flow through the variable choke 44, and also the flow rate is determined by the aperture areas of the inlet port 55 and the outlet port 56 of the pilot valve C, the above-described pressure difference is determined by the aperture areas of the inlet port 55 and the outlet port 56, that is, by the amount of the current fed to the solenoid 59.

On the other hand, since the poppet 32 is subjected to a pushing force $F_1$ directed to the right as viewed in this figure due to an inlet side pressure P acting upon a shoulder portion 32*a* and a pushing force $F_2$ directed to the left as viewed in this figure due to an outlet side pressure $P_0$ within the first back pressure chamber 38*a* and the second back pressure chamber 38*b*, as a result of the difference between a pressure receiving area of the shoulder portion 32*a* and a pressure receiving area of the first and second back pressure chambers 38*a* and 38*b* as well as the aforementioned pressure difference, the poppet 32 is moved rightwards, hence the seat surface 32*b* and the valve seat 30*a* are separated from each other, and pressurized oil flows from the inlet port 30 to the outlet port 31.

At this time, since the aperture area of the inlet port 30 and the outlet port 31, that is, the flow rate to the tank 2 is proportional to the above-mentioned pressure difference, the flow rate to the tank 2 is controlled by the amount of current feed to the solenoid 59, so that the device has a flow rate control function.

It is to be noted that under the condition shown in FIG. 1, the inlet port 55 and the outlet port 56 of the pilot valve C are intercepted from each other and the above-described pressure difference is not produced, so that the poppet 32 is pushed to the left by a resilient force, and the seat surface 32*b* is held in press contact with the valve seat 30*a* to intercept the inlet port 30 and the outlet port 31 from each other.

In the above explanation, a pressure balance condition of the poppet 32 in the poppet valve is as follows:

$$\frac{P_0}{P_1} = \frac{d_3^2 - d_1^2 - d_2^2}{d_3^2 - d_2^2} = \text{constant}$$

where $d_1$ represents a diameter of the outlet port 31, $d_2$ represents a diameter of a spool smaller land portion 34*a*, and $d_3$ represents a diameter of a spool larger land portion 34*b*.

From the above-mentioned reasons, if the area ratio proportions which determine the pressure balance of the first and second poppet valves A and B are made to differ as follows, provision can be made such that after the first poppet valve A has been operated to switch, the second poppet valve B may be operated to switch:

$$\frac{d_{3A}^2 - d_{1A}^2 - d_{2A}^2}{d_{3A}^2 - d_{2A}^2} > \frac{d_{3b}^2 - d_{1B}^2 - d_{2B}^2}{d_{3B}^2 - d_{2B}^2}$$

For instance, when $d_{3A}=d_{3B}$ and $d_{1A}=d_{1B}$ are fulfilled, it is only necessary to fulfil the relation of $d_{2A}>d_{1B}$.

In other words, the area difference between the first back pressure chamber 38*a* and the second back pressure chamber 38*b* of the first poppet valve A is made larger than that of the second poppet valve B so that when the amount of current feed to the solenoid 59 is small, hence the flow rate is small and the pressure different between the front and the rear of the variable choke 44 is small, the poppet 32 of the first poppet valve A may move to the right but the poppet 32 of the second poppet valve B may not move to the right, but when the amount of current feed to the solenoid 59 is further increased to make the flow rate large and the pressure difference has become large, the poppet 32 of the second poppet valve B moves to the right.

As a result of such arrangement, the first and second poppet valves A and B can be sequentially operated to switch by operating the single pilot valve C to switch.

Figure 2:
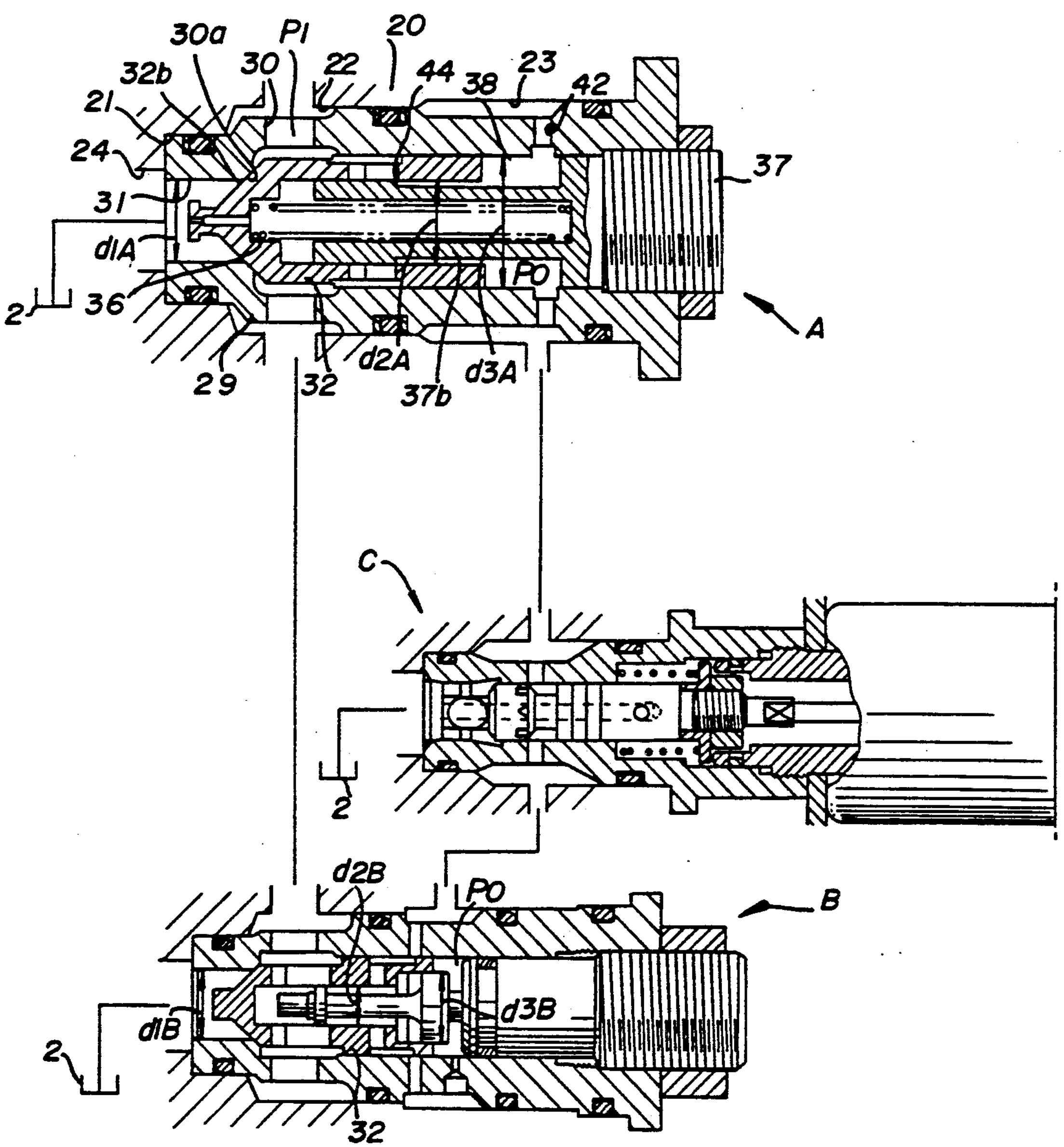

FIG. 2 shows a second preferred embodiment, in which a poppet 32 o a first poppet valve A is made freely slidable along a smaller diameter cylindrical portion 37*b* of an axial body 37, also provision is made such that a seat surface 32*b* is made to butt against a valve seat 30*a* by means of a spring 36 to intercept an inlet port 30 and an outlet port 32 from each other, a diameter $d_{1A}$ of the outlet port 31 and may be balanced according to the following equation:

$$\Delta P = P_1 - P_0 = \frac{F(\text{resilient force})}{\pi/4(d_{3A}^2 - d_{2A}^2)}$$

As a result of such arrangement, if the pressure difference between the front and the rear of the variable check 44 becomes larger than $\Delta P$, the poppet 32 of the first poppet valve A moves to the right, subsequently a spool 57 of a pilot valve C further moves to the right, hence a flow rate to the tank 2 is increased, a pressure $P_0$ within the back pressure chamber 38 is further lowered, and if it becomes lower than $P_0$ in the equation of balance for the second poppet valve B, then the poppet 32 of the second poppet valve B moves to the right.

Figure 3:
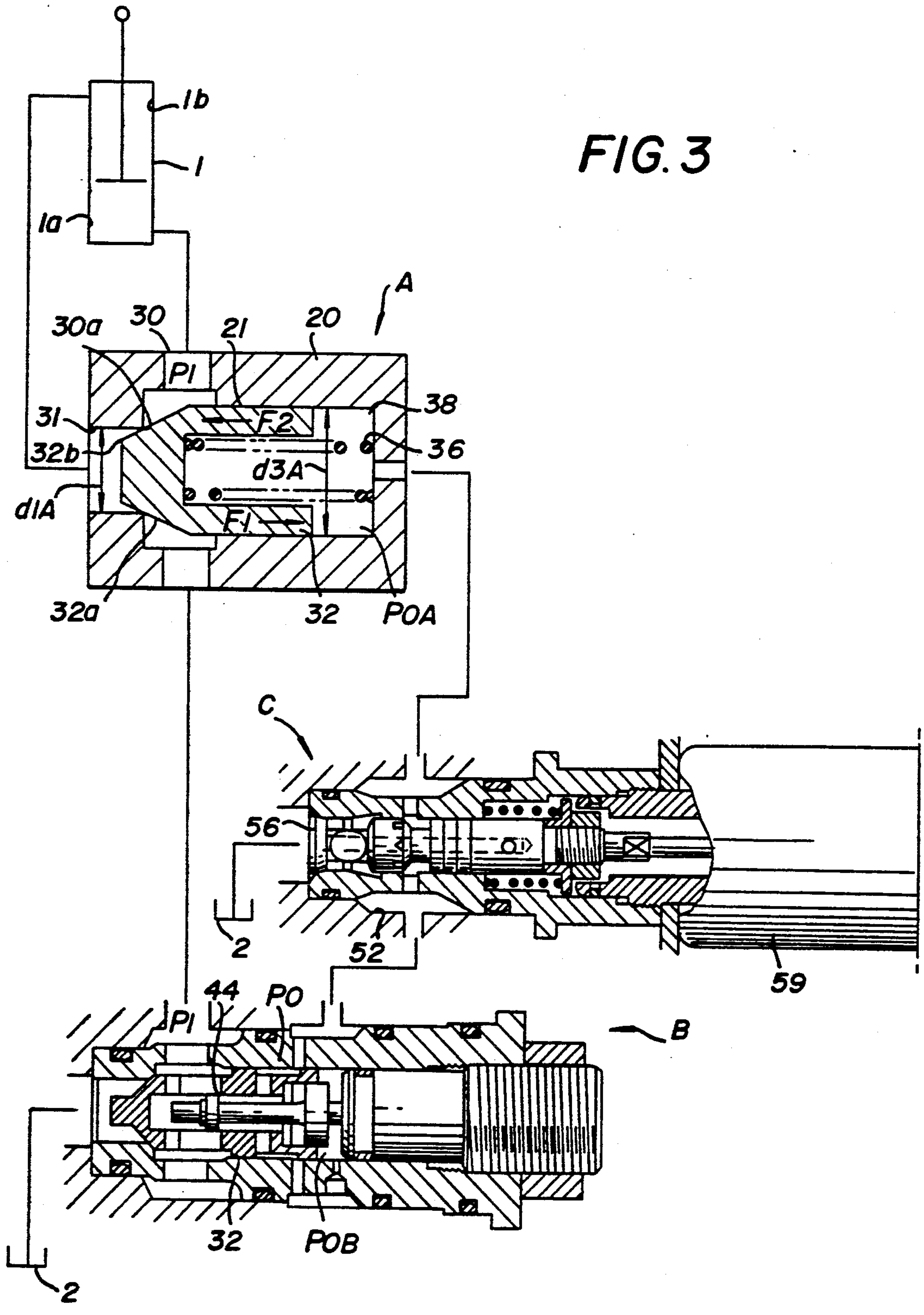

FIG. 3 shows a third preferrred embodiment, wherein in a first poppet valve A, a poppet 32 is fitted and inserted in a valve bore 21 of a valve body 20, this poppet 32 is biased by means of a spring 36 so that a seat surface **32*b* may butt against a valve seat 30*a*, thereby an inlet port 30 and an outlet port 31 are intercepted from each other, a back pressure chamber 38 is communicated with a first port 52 of a pilot valve C, and a pressure in the back pressure chamber 38 when the poppet 32** of the above-mentioned first poppet valve A moves to the right, that is, a valve-opening pressure $P_{0A}$ is set lower than a valve-opening pressure $P_{0B}$ of a second poppet valve B.

If such arrangement is made, when pressurized oil flows out from an outlet port 56 of the pilot valve C to a tank 2, the pressure in the first port 52 is lowered, and the pressure in the back pressure chamber 38 of the first poppet valve A is lowered.

And, if the pressure in the back pressure chamber 38 becomes lower than the valve-opening pressure $P_{0A}$, the poppet 32 moves to the right against the spring 36, and the first poppet valve A is operated to switch.

If the pressure in the first port 52 is further lowered and becomes lower than the valve-opening pressure $P_{0B}$ of the second poppet valve B, then a poppet 32 of the second poppet valve B is operated to switch.

It is to be noted that in FIG. 3, the outlet port 31 of the first poppet valve A is connected to a lowering pressure chamber **1*b* of a boom cylinder 1 so that pressurized oil in a raising pressure chamber 1*a* may be fed to the lowering pressure chamber 1*b* and the lowering pressure chamber 1*b* may not become negative pressure. In this connection, a pressurized oil feed circuit for the boom cylinder 1 in the third preferred embodiment illustrated in FIG. 3** is omitted.

Figure 4:
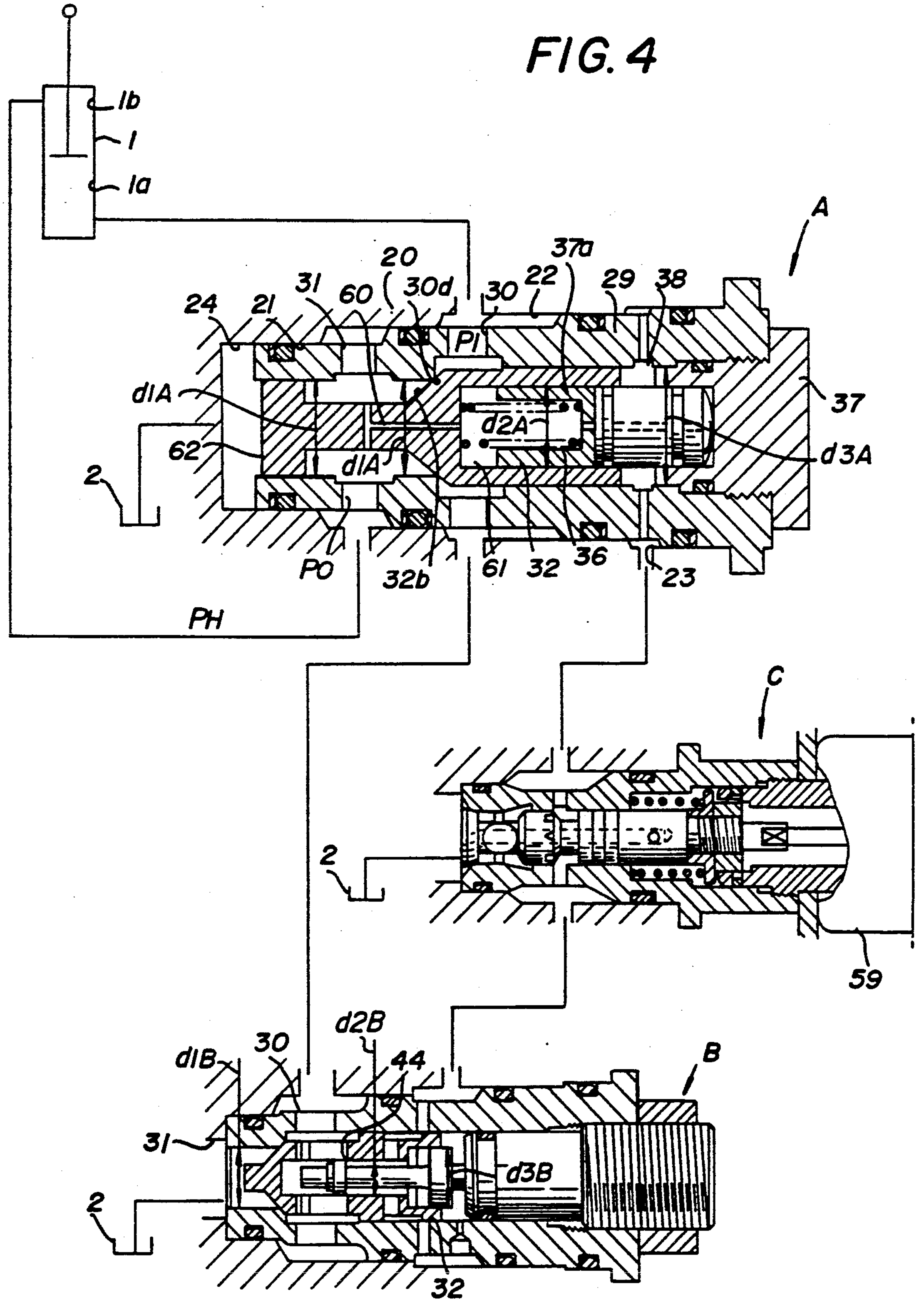

FIG. 4 shows a fourth preferred embodiment, wherein in a head portion of a poppet 32 of a first poppet valve A is formed a back pressure chamber 61 to which pressure in an outlet port 31 is introduced through a narrow hole 60, and thereby the valve A is constructed in such manner that the poppet 32 may be moved in the direction for intercepting an inlet port 30 and the outlet port 31 from each other in response to the pressure in the outlet port 31.

Furthermore, at a tip end portion of the poppet 32 is integrally formed a larger diameter portion 62 so that a force pushing the poppet valve 32 to the right caused by the pressure at the outlet port acting upon a seat surface **32*b* of the poppet 32** may be offset.

If such arrangement is made, when a current has been fed to the solenoid 59 of the pilot valve C, just as the above-described third preferred embodiment, the poppet 32 of the first poppet valve A moves to the right and communicates the inlet port 30 with the outlet port 31, and further when the amount of current feed to the solenoid 59 has been increased, the poppet 32 of the second poppet valve B moves to the right and communicates the inlet port 30 with the outlet port 31, and so, the first poppet valve A and the second poppet valve B can be sequentially operated to switch.

At the same time, the pressure at the outlet port 31 of the first poppet valve A is introduced to the back pressure chamber 61 to [illegible] the poppet 32 to the left and intercept the inlet port 30 from the outlet port 31, and so, the pressure at the outlet port 31 can be made to have a predetermined valve.

More particularly, the poppet 32 is subjected to a rightward force due to the pressure acted upon the shoulder portion **32*a*, and a pressure receiving area of the shoulder portion 32*a*** is equal to $$\left(\frac{d_{3A}-d_{1A}}{2}\right)^2\pi.$$

Also, it is subjected to a leftward force due to the pressure acted upon the back pressure chamber 38 and the back [illegible] chamber [illegible], and their pressure receiving areas are equal to $$\left(\frac{d_{3A}-d_{2A}}{2}\right)^2\pi$$

and $d_{2A}{}^2\pi$, respectively.

And upon the shoulder portion **32*a* acts the pressure $P_1$ at the inlet port 30, upon the back pressure chamber 38 acts the pressure $P_{0B}$ reduced by a variable choke 44 of the second poppet valve B, and upon the back pressure chamber 38 acts the pressure $P_0$ at the outlet port 31**.

Accordingly, the poppet 32 is balanced under the condition of:

$$P_1\times\left(\frac{d_{3A}-d_{1A}}{2}\right)^2\pi=$$
$$P_{0B}\times\left(\frac{d_{3A}-d_{2A}}{2}\right)^2\pi+P_0\times\left(\frac{d_{2A}}{2}\right)^2\pi$$

and therefore, from the preceding equation, the following relation is derived:

$$P_0=\frac{P_1(d_{3A}-d_{1A})^2-P_{0B}(d_{3A}-d_{2A})^2}{d_{2A}^2}$$

Here, since $P_{0B}$ takes a value proportional to $$\frac{d_{3B}^2-d_{1B}^2-d_{2B}^2}{d_{3B}^2-d_{2B}^2}$$

which depends upon the diameters of the respective portions of the second poppet valve B, it is determined by the second poppet valve.

Accordingly, the pressure $P_0$ at the outlet port 31 of the first poppet valve A can be arbitrarily selected by determining the diameters of the respective portions.

It is to be noted that in the fourth preferred embodiment illustrated in FIG. 4 also, just like the third preferred embodiment illustrated in FIG. 3 a pressurized oil feed circuit for a boom cylinder 1 is omitted.

Next, a fifth preferred embodiment will be explained with reference to FIG. 5.

Figure 5:
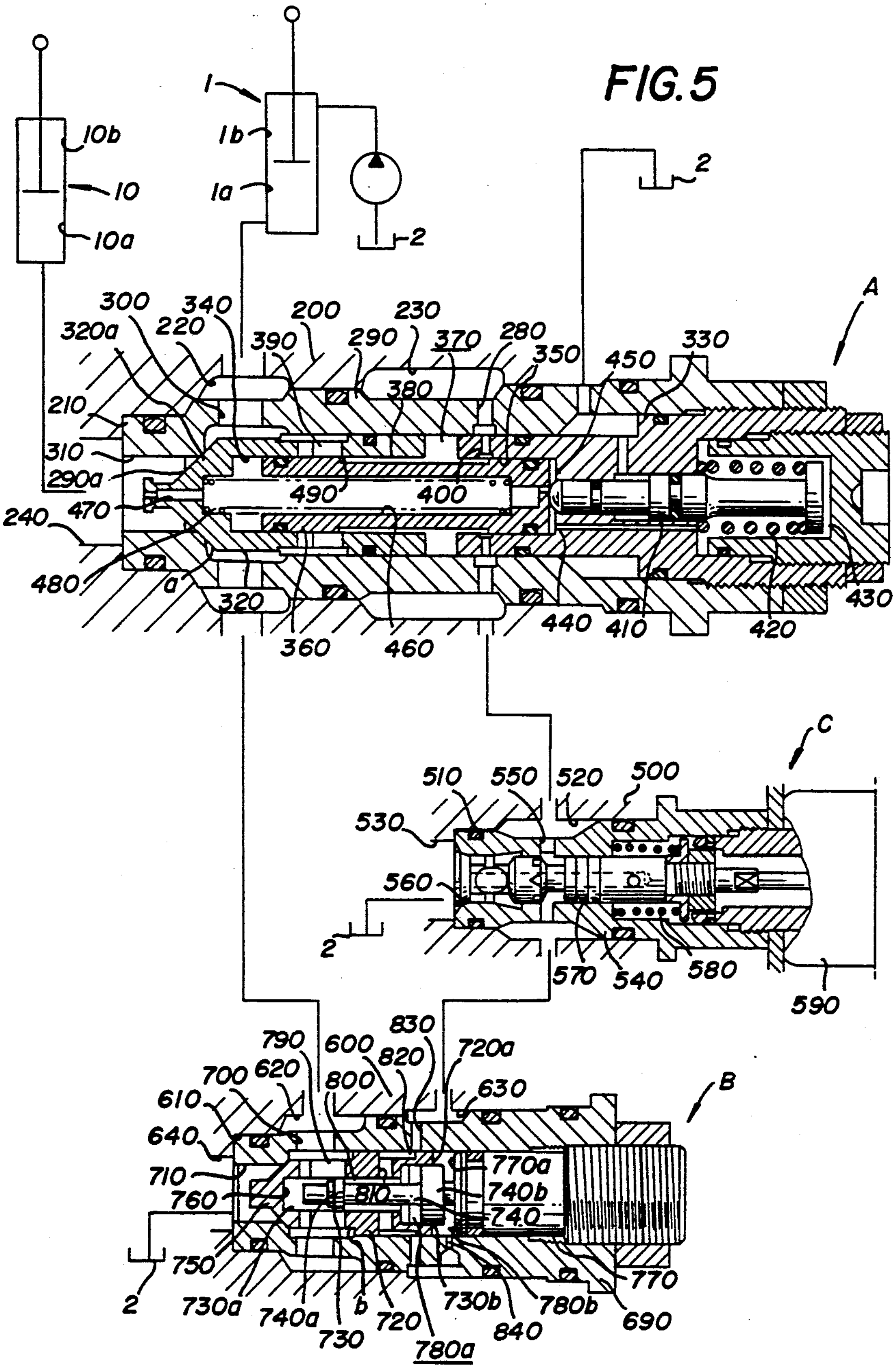
FIG. 5 is a schematic cross-section view of an essential part, illustrating a fifth preferred embodiment of the present invention.

As shown in FIG. 5, a first poppet valve A, a second poppet valve 2 and a pilot valve C are provided, and the arrangement is such that by operating the pilot valve C to switch, the first poppet valve A and the second poppet valve B can be sequentially operated to switch.

The above-mentioned first poppet valve A communicates or intercepts a hydraulic actuator, for instance, a raising pressure chamber 1*a* of a boom cylinder 1 with or from another hydraulic actuator, for instance, a raising pressure chamber 10*a* of an arm cylinder 10, the above-mentioned second poppet valve B communicates or intercepts the raising pressure chamber 1*a* of the aforementioned boom cylinder 1 with or from a tank 2, and delivery pressurized oil of a pump 3 is adapted to be controllably fed to the raising pressure chambers, 1*a* and 10*a* and the lowering pressure chambers 1*b* and 10*b* of the boom and arm cylinders 1 and 10, respectively, via operation valves 4 and 4'.

The aforementioned first poppet valve A is constructed in the following manner.

That is, in a valve bore 210 of a valve main body 200 are respectively formed a first port 220 communicating with the raising pressure chamber 1*a* of the boom cylinder 1, a second port 230 communicating with the pilot valve C, and a third port 240 communicating with the raising pressure chamber 10 of the arm cylinder 10, also in the above-mentioned valve bore 210 is fitted and inserted a cylindrical body 290, in the aforementioned cylindrical body 290 are formed an inlet port 300 opening at the first port 220, an outlet port 310 opening at the third port 240, and a port 280 opening at the second port 230, also a poppet 320 for communicating or intercepting the inlet port 300 with or from the outlet port 310 is slidably fitted and inserted in the cylindrical body 290, further an axial rod 330 is fixedly inserted therein, and a rod body 360 is fitted and inserted over a blind bore 340 of the poppet 320 and a blind bore 350 of the axial rod to form a back pressure chamber 370 of the poppet 320, a middle portion in the axial direction of the above-mentioned rod body 360 has a reduced diameter and forms an oil passageway 380 jointly with the above-mentioned blind bores 340 and 350, a slit groove 390 formed in the poppet 320 and the above-mentioned back pressure chamber 370 are communicated with each other through this oil passageway 380, also the slit groove 390 and a port 400 formed in the axial rod 330 are communicated with or intercepted from each other through the oil passageway 380, the port 400 communicates with the above-mentioned port 280, a push rod 410 fitted and inserted in the above-described axial rod 330 butts against an end surface of the rod body 360 and also is pushed to the right as viewed in the figure by a spring 420, a pressure receiving chamber 430 pushing the push rod 410 to the left communicates with the above-mentioned outlet port 310 through a hole 440 formed in the axial rod 330, a narrow hole 450 in the rod body, a blind bore 460 and a hole 470 in the poppet 320, the above-mentioned poppet 320 is pushed to the left by a spring 480, hence a seat surface 320*a* butts against a seat 290*a*, and thereby the inlet port 300 and the outlet port 310 are intercepted from each other.

Since the first poppet valve A is constructed in the above-described manner, when the second port 230 is intercepted and pressurized oil in the second port 230 does not flow, the pressures in the inlet port 300 and in the back pressure chamber 370 become equal to each other, hence the poppet 320 is pushed to the left by the spring 480 and intercepts the inlet port 300 from the outlet port 310, resulting in the state shown in FIG. 5.

Under this condition if the pressurized oil in the second port 230 flows out to the tank 2, then the pressurized oil in the inlet port 300 flows through the second port 230 to the tank 2, and at this time since pressure drop occurs as choked at the communicating portion between the slit groove 390 and oil passageway 380, the pressure in the back pressure chamber 370 becomes lower than the pressure on the side of the inlet port 300. In other words, the communicating portion between the slit groove 390 and the oil passageway 380 forms a variable choke 490.

Thereby the poppet 320 is pushed to the right, hence the inlet port 300 and the outlet port 310 communicates with each other and the pressurized oil in the inlet port 300 flows out to the outlet port 310, but as the communication cross-section area is very small and the flow is choked there, the pressure on the side of the outlet port 310 becomes lower than the pressure on the side of the inlet port 300.

If the pressure on the side of the outlet port 310 becomes a preset pressure, the push rod 410 is pushed to the left against the spring 420 by the pressure within the pressure receiving chamber 430, the rod body 360 is pushed to the left against the spring 480 and intercepts the port 400 from the oil passageway 380, so that the flow of pressurized oil from the inlet port 300 to the second port 230 disappears, the pressure in the back pressure chamber 280 rises and the poppet 320 is pushed to the left to intercept the inlet port 300 from the outlet port 310.

The above-mentioned second port B is constructed in the following manner.

That is, in a valve bore 610 of a valve body 600 are respectively formed a first port 620 communicated with the raising pressure chamber 1*a* of the boom cylinder 1, a second port 630 communicated with the pilot valve C, a third port 640 communicated with a tank 2, in the above-described valve bore 610 is fitted and inserted a cylindrical body 690, in the aforementioned cylindrical body 690 are formed an inlet port 700 opening at the first port 630 and an outlet port 710 opening at the third port 640, also a poppet 720 for communicating or intercepting the inlet port 700 with or from the outlet port 710 is slidably fitted and inserted therein, in the aforementioned poppet 720 is formed an axial bore 730 having a stepped configuration consisting of a smaller diameter bore 720*a* and a larger diameter bore 720*b*, in the above-mentioned axial bore 730 is fitted and inserted a spool 740 having a first land portion 740*a* with a smaller diameter and a second land portion 740*b* with a larger diameter, and an annular chamber 75 is formed between the spool 740 and the smaller diameter bore 730*b*, while a first back pressure chamber 780*a* is formed between the larger diameter bore 730*b* and the second land portion 740*b*.

The above-mentioned spool 740 is made to butt against a front surface 770*a* of an axial body 770 fixedly fitted and inserted in the above-mentioned cylindrical body 690 by a spring 760 to form a second back pressure chamber 780*b* between the rear surface 720*a* of the poppet 720 and the spool 740, the above-mentioned annular chamber 750 is controllably opened at the aforementioned inlet port 700 through a variable choke 800 consisting of a slit-groove-shaped inflow port 790 formed in the poppet 720 and the first land portion 740*a* of the spool 740, also it communicates with the aforementioned second port 630 through an oil hole 810 formed in the poppet 720 and an oil hole 830 formed in the smaller diameter portion 820 and the cylindrical body 690, and also the aforementioned second back pressure chamber 380*b* communicates with the above-mentioned second port 630 via a choke 840.

Since the second poppet valve B is constructed in the above-described manner, like the above-described first poppet valve A, a pressure difference is produced between the front and the rear of the variable choke 800 by communicating the pressurized oil in the second port 630 to the tank 2, the poppet 720 moves to the right, resulting in communication of the inlet port 700 with the outlet port 710, and moreover arrangement is made such that the pressure difference between the front and the rear of the variable choke 800 when the poppet 720 moves to the right may arise after the push rod 410 of the above-mentioned first poppet valve A has been pushed to the left.

In other words, the poppet 320 of the first poppet valve A and the poppet 720 of the second poppet valve B are pushed to the left by the pressures in the back pressure chamber 370 and in the first and second back pressure chambers 780*a* and 780*b*, and pushed to the right by the pressures in the pressure receiving portions a and b, and since these pressures are identical, by making area ratios of them different from each other, the poppet 720 of the second poppet valve B can be operated in the above-described manner.

The above-mentioned pilot valve C is constructed in the following manner.

That is, the construction is such that a first port 520 and a second port 530 are formed in a valve bore 510 of a valve main body 500, a cylindrical body 540 is fitted and inserted in the valve bore 510, a spool valve 570 for communicating or intercepting an inlet port 550 with or from an outlet port 560 is fitted and inserted in this cylindrical body 540, the spool valve 570 is held at an intercepting position by means of a spring 580, and it can be moved to a communicating position by means of a solenoid 590, the first port 520 communicates with the second ports 230 and 630 of the above-described first and second poppet valves A and B, the second port 530 communicates with the tank 2, also depending upon an amount of current feed to the solenoid 590 the aperture areas of the inlet port 550 and the outlet port 560 are increased or decreased, and thereby a flow rate of the flow from the inlet port 520 to the tank 2 is controllably increased or decreased so that the pressure on the side of the inlet port 520 can be regulated. In other words, the pilot valve C includes a variable choke portion which is controlled by the amount of current feed to the solenoid 590.

Since the above-described arrangement is made, if the flow rates of the flows flowing from the second ports 230 and 630 of the first and second poppet valves A and B to the tank 2 is increased by increasing the communication areas of the inlet port 550 and the outlet port 560 according to the amount of current feed to the solenoid 590 of the pilot valve C, then pressure differences are produced between the front and the rear of the variable chokes 490 and 800, hence the poppet 320 of the first poppet valve A operates in the above-described manner, and thereafter the poppet 720 of the second poppet valve B operates in the above-described manner.

Figure 6:
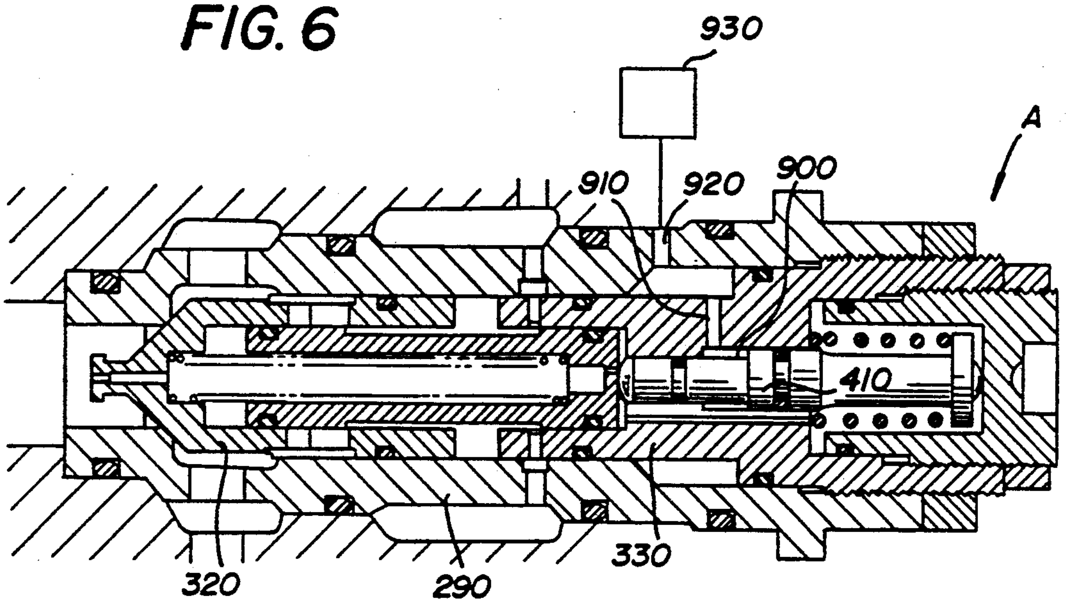
FIGS. 6 and 7 are cross-section views of different first poppet valves which are available in the fifth preferred embodiment illustrated in FIG. 5.

Alternatively, the device could be constructed in such manner that as shown in FIG. 6 a pressure chamber 900 for pushing a push rod 410 to the right is formed, this pressure chamber 900 is communicated with external pressure feed means 930 through a communication hole 910 formed in a axial rod 330 and a communication hole 920 formed in a cylindrical body 290, and pressurized oil may be fed into the pressure chamber 900 by the external pressure feed means.

If the device is constructed in such manner, the pressure at the outlet port 310 when the push rod 410 moves to the right can be arbitrarily controlled.

Figure 7:
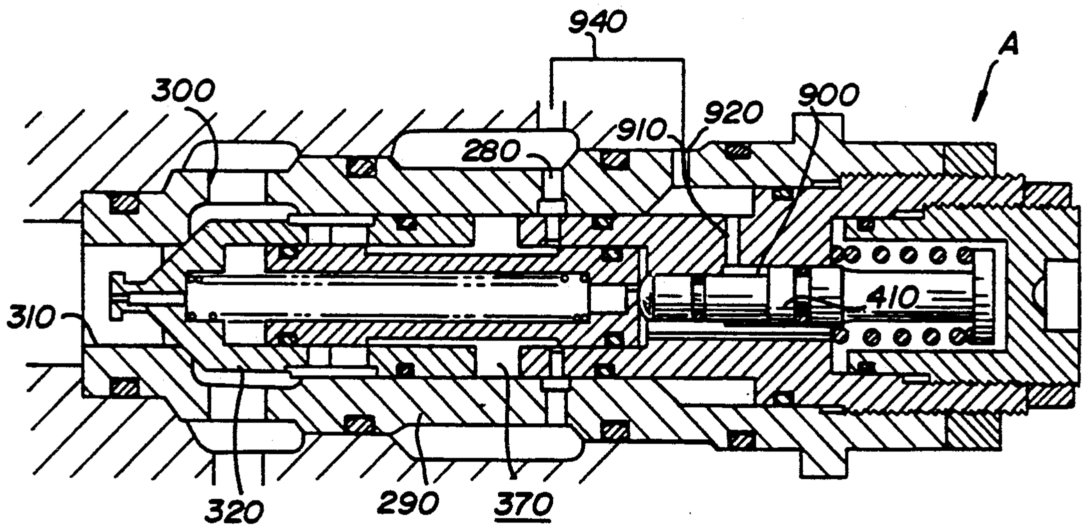

Also, the device could be constructed in such manner that as shown in FIG. 7, the above-mentioned pressure chamber 900 is communicated with an oil passageway 280 through a communication path 940, and the pressure in the back pressure chamber 370 is led to the chamber 900 to push the push rod 410 to the right.

If such arrangement is made, the pressure at the outlet port 710 when the push rod 410 moves to the left can be made higher than that in the case of FIG. 5.

We claim:

1. A poppet valve device comprising: at least two, first and second poppet valves, each of which is constructed in such manner that a poppet for communicating or intercepting an inlet port and an outlet port formed on one side of a cylindrical body fitted within a valve body may be moved towards a communicating position by a pressure on the inlet port side acting upon a pressure receiving portion, while it may be moved towards an intercepting position by a pressure acting upon a back pressure chamber; and a pilot valve which connects the back pressure chambers of the respective ones of said plurality of poppet valves to a tank, and which includes a variable choke portion controlled by an external input signal so that the pressures in the respective back pressure chambers when the respective poppets in said respective poppet valves are moved to the positions for communicating the respective inlet ports with the respective outlet ports are individually regulated.

2. A poppet valve device as claimed in claim 1, wherein the poppet of said first poppet valve is mounted so as to be freely slidable along a smaller diameter cylindrical body of an axial body fitted within said cylindrical body from the other side of said cylindrical body, and is biased towards said intercepting position by a resilient force of a compression spring interposed between said axial body and said poppet, and the inner diameters of the respective ones of said outlet port and said poppet are made identical.

3. A poppet valve device as claimed in claim 1, wherein a valve-opening pressure in the back pressure chamber when the poppet in said first poppet valve is moved towards said communicating position, is set lower than a valve-opening pressure of said second poppet valve.

4. A poppet valve device as claimed in claim 3, wherein the inlet port of said first poppet valve communicates with a boom raising pressure chamber in a boom cylinder of a construction machine such as a power shovel, and the outlet port communicates with a boom lowering pressure chamber in said boom cylinder.

5. A poppet valve device as claimed in claim 1, wherein the poppet in said first poppet valve includes a back pressure chamber to which the pressure at its outlet port is introduced via a narrow hole drilled at the head portion of the poppet so that said poppet may be biased towards the intercepting position by the pressure at the outlet port, and a larger diameter portion formed integrally at the tip end portion of said poppet valve so as to offset a pressing force in the direction directed to the communicating position of said poppet caused by the pressure at the outlet port acting upon a seat surface of the poppet in said first poppet valve.

6. A poppet valve device as claimed in claim 5, wherein the inlet port of said first poppet valve communicates with a boom raising pressure chamber in a boom cylinder of a construction machine such as a power shovel, and the outlet port communicates with a boom lowering pressure chamber in said boom cylinder.

7. A poppet valve device as claimed in claim 1, which comprises two, first and second poppet valves whose back pressure chambers are communicated with their tank sides so that the pressure acting upon the respective back pressure chambers may serve as a tank side pressure and also communicated with the inlet port sides via chokes, and a pilot valve including variable choke portions provided between said first and second poppet valves and a tank and controlled by an external input signal, wherein the construction is such that if the outlet side pressure of said first poppet valve becomes a preset pressure or higher, the inlet port and the outlet port of said first poppet valve are intercepted from each other, whereas when the pressure in the back pressure chamber in said second poppet valve causes the poppet in said first poppet valve to come at the communicating position, if it becomes a lower pressure than the pressure in the back pressure chamber in the first poppet valve, the inlet port and the outlet port of said second poppet valve may be communicated with each other.

8. A poppet valve device as claimed in claim 1, wherein said first poppet valve includes a rod body fitted in an inner bore of the poppet from the base end side of said cylindrical body fitted in an inner bore of said poppet from the base end side of the same poppet via a compression spring, an axial rod inserted from the other side of said cylindrical body fitted in the valve bore so as to support said rod body, and a push rod slidably fitted via a compression spring in an axial bore drilled in said axial rod so as to bias said axial rod towards the head portion of the poppet.

9. A poppet valve device as claimed in claim 8, which comprises a pressure chamber formed between said push rod and said cylindrical body so as to push said push rod towards the other side of said cylindrical body against the compression spring, and external pressure feed means communicated with said pressure chamber via communication holes formed respectively in said cylindrical body and said axial rod.

10. A poppet valve device as claimed in claim 8, which comprises a pressure chamber formed between said push rod and said cylindrical body so as to push said push rod towards the other side of said cylindrical body against the compression spring, and a passageway for communicating said pressure chamber via communication holes formed respectively in said cylindrical body and said axial rod to the port formed in said first poppet valve so as to communicate with said pilot valve.

* * * * *